Sept. 7, 1943.  I. B. HOLTZ  2,328,808
AUTO SKID CHAIN
Filed May 10, 1943
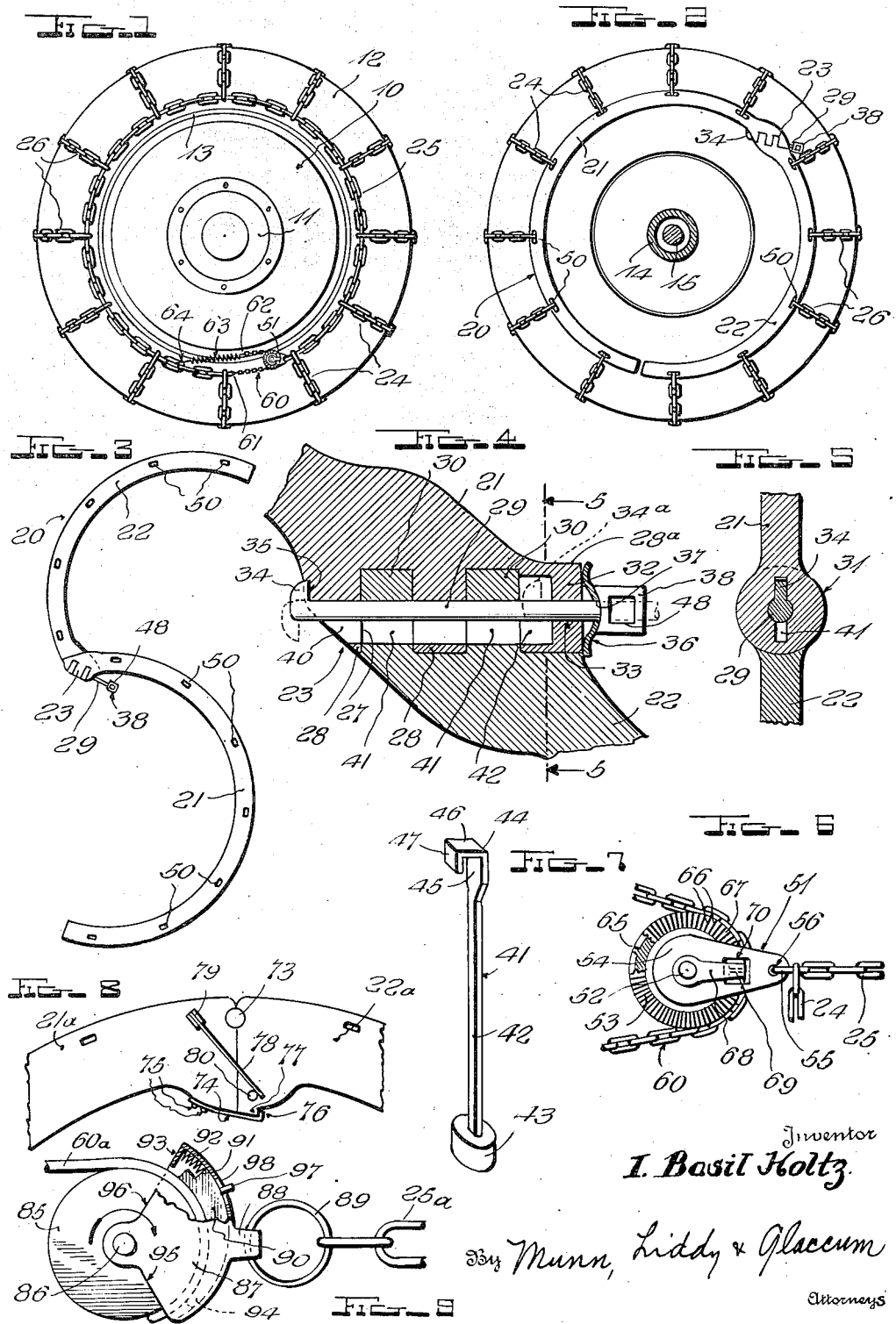

Patented Sept. 7, 1943

2,328,808

UNITED STATES PATENT OFFICE 2,328,808

AUTOMOBILE SKID CHAIN

Ireneus Basil Holtz, Ashville, Pa.

Application May 10, 1943, Serial No. 486,369

8 Claims. (Cl. 152—242)

This invention relates to tire chains.

An object of the invention is a provision of a tire chain which may be easily and readily applied to an automobile tire casing without necessitating the raising of the wheels.

Another object of the invention is the provision of a tire chain which may be readily applied to a wheel without necessitating raising of the same, the same being readily removable from the casing without requiring the jacking up of the wheels, means being employed for readily connecting the same in position for maintaining the same in position.

A further object of the invention is the provision of a tire chain for casings, in which a split ring formed of two sections pivotally connected together is employed as a replacement for one of the long side chains of the usual anti-skid chains, one of the sections being applied directly to the casing while the other section has been moved away from the first mentioned section together with a main side chain and the connected cross links, said movable section and connected cross chains, movable toward the tire casing with means for securing the ends of the side chain together, said skid chains being applied to the automobile casing without necessitating the raising of the wheel.

A still further object of the invention is the provision of a tire chain which includes a split ring formed of a pair of hinged sections, a hinge means being employed for connecting the sections together which may be readily released while still maintaining the sections connected together.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claims.

Fig. 1 is a side view of a wheel and casing, showing the tire chains applied thereto.

Fig. 2 shows the opposite or inner face of the wheel.

Fig. 3 is a side view of a split ring formed of a pair of hinged sections removed from the tire chain.

Fig. 4 is an enlarged fragmentary section showing the hinged means and the two sections of the split ring.

Fig. 5 is a vertical section of the hinged means taken along the line of 5—5 of Fig. 4.

Fig. 6 is an enlarged fragmentary side view showing a sprocket arrangement for connecting the ends of the main chain of the anti-skid device.

Fig. 7 is a view in perspective of a wrench for turning the hinged pin of the sections of the split ring.

Fig. 8 is a fragmentary side view of a modified form of the hinged means for the sections of the split ring.

Fig. 9 is an enlarged fragmentary side view partly in section of a modified form of a combined pulley and clutch device which may be used in place of the device shown in Fig. 6.

Referring more particularly to the drawing 10 designates a vehicle wheel which has the outer hub portion 11, and a tire casing 12 mounted on the rim 13 of the wheel. A housing 14 encloses a rear axle 15, which is connected in a well known manner to the wheel 10.

An anti-skid device is shown applied to the wheel, and this device is specially constructed so that the operator may readily place the anti-skid device on the casing 12, or remove the same without the necessity of raising the wheels during application or removal of the anti-skid device. The anti-skid device is so constructed that it will not require the operator to come in contact with the wheel or other parts, thus eliminating the usual dirt on his clothes or hands during the application or removal.

Furthermore, a particular mechanism is employed for releasing the hinges between the sections of a split ring forming one part of the anti-skid device.

This ring employs one of the usual main chains to which the cross chains are connected.

Referring more particularly to Figs. 2, 3 and 4, it will be seen that a split ring generally designated by the numeral 20 is disposed at the inner face of a wheel, and this split ring consists of a pair of sections 21 and 22 which are hingedly connected together at 23. Section 21 constitutes the main section and this section is applied to the tire casing together with the outer cross chains 24 and a portion of a main long chain, generally designated by the numeral 25. At this time the second section 22 has been moved laterally away from the casing together with the connected cross chains 26 and the remaining portion of the main chain 25.

The means for hinging the sections 21 and 22 is more particularly shown in Figs. 4 and 5.

The section 21 is provided with a rolled end, which is cut away at spaced points as shown at 27 to provide bearings 28 for a hinge pin 29. The section 22 of the split ring is also provided with a rolled end which is cut away in spaced points to provide complementary bearings 30 that are located between the bearings 28 and which receive the hinge pin.

It will be noted from Fig. 5 that the sections 21 and 22 at the hinged portion 23 may be enlarged or thickened as shown at 31 to provide sufficient bearing surface to take care of the bent construction of the hinge member. The bearing 28ª of the section 21 has a wall 32 which may be considerably thicker than the walls of the bearings 28, and is provided with a passage 33 to receive the pin 29.

The pin 29 is provided with a key 34, which is normally seated within a pocket 35 in the section 21 when the pin is extended entirely through the bearings 28 and 30. A spring 36 has a central opening 37 which receives the pin 29 and the ends of this spring rest upon the outer face of wall 32, and against a head 38 which has an opening 48. The head is adapted to be engaged by a wrench to be presently described. The spring exerts pressure on the head so that the spring will at all times tend to maintain the key 34 in the slot or pocket 35. It will be noted that the bearings are cut away as shown at 40, 41 and 42 so that when the pin is rotated through 180° the key 34 will be in its lowermost position as shown in Fig. 4 in dotted lines so that the pin may be withdrawn with the key passing through the cut-away portion 40 and 41, until it is resting in the cut-away portion 42 in the bearing 28ª. When the pin is moved to this position the bearings are released from the action of the pin, but the pin cannot be withdrawn because of the wall 32, and the pin is then moved to the dotted line position in Fig. 4 as indicated at 34ª. In other words the hinge between the sections 21 and 22 is broken and the pin 29 can be moved laterally with respect to the bearings although the pin 29 will still be in position and will not be lost from the hinged portion 23.

A tool generally designated by the numeral 41 is shown in Fig. 7 and this tool consists of a shank 42, a hand grip 43 and a hook portion 44. The hook portion consists of a flat piece 45 which is bent at right angles as shown at 46 with another portion 47 bent at right angles to the portion 46, which is adapted to be received by the opening 48 whereby when the tool is turned the pin 29 will be revolved to cause the key 34 on the pin 29 to be removed from the pocket 35. In view of the fact that the shank of the tool is quite long, it may be made collapsible so that it can be folded and conveniently placed within the trunk of a car.

The sections 21 and 22 are provided with openings 50 in which are secured one end of the cross chains 24 and 26. The other ends of these cross chains are connected to links of the side chain 25 at the other side of the casing 12.

A hanger 51 is provided with an axle 52 and a sprocket 53 is mounted for rotation on the axle. This hanger is U-shaped so that the sprocket is located between the free ends of the legs 54 of the hanger. One end 55 of the main chain 25 is secured as shown at 56 to the outer end of the hanger 51.

An auxiliary chain 60 has one end 61 connected to the main chain 25 while the other end is connected at 62 to a coil spring 63. This coil spring has a hook 64 at its other end which is adapted to be engaged with a link of chain 25, but inwardly of the end of said chain.

The auxiliary chain 60 is trained over the sprocket wheel 53 and its links are adapted to engage the teeth 65 of said sprocket. The sprocket is provided with ribs 66 between which are formed grooves 67. A pawl 68 is secured to the shaft or the axle 52 or secured to the leg 54 of the U-shaped hanger 51 in order to prevent the pawl from moving in a rotary motion. The outer free end 69 of the pawl has a V-shaped lateral projection which extends through an opening 70 formed in the leg 54, and is adapted to engage the groove 67 between the ribs 66 in order to maintain the sprocket 53 against rotation after the auxiliary chain 60 has been drawn up taut and after the hook 64 on the spring 63 has engaged the proper link on the main chain 25. It will be seen by this construction that when the pin 29 and the key 34 are in the full line position in Fig. 4, the sections 21 and 22 of the split ring 20 will be in alinement to form substantially a circle, and when the chain 25, together with the auxiliary chain 60, are in the positions as shown in Fig. 1, the anti-skid device will be ready for traveling with the casing 12.

When it is desired to remove the anti-skid device from the tire it is only necessary to release the spring 63 from its connection with the main chain 25 and the pawl 68 from its locked position with the sprocket 53. The chain may be slid over the sprocket wheel since space has been left between the wheel 53 and the inner end of the hanger 55 for this purpose. The pin 29 is then rotated by the tool 41 until the key 34 has been moved to the dotted line position in 34ª when said key may be withdrawn to the position where the key appears in dotted line position so that the ring 20 may be broken and the pin 29 may then be moved to the dotted line position with respect to a vertical plane passing through the casing 12 and at right angles to the axle 15.

In Fig. 8 is shown a modified form of the ring in which the two sections 21ª and 22ª are moved outwardly from each other on the pivot pin 73. However, these two sections are held in a position to form a circular ring by means of a flat spring 74 which is secured at 75 to the inner edge of the section 21ª where the outer free end of the spring is provided with an inturned lug 76 which engages over a shoulder 77 formed on the inner edge of the section 22ª. A second flat spring 78 is secured at 79 to the outer face of the section 21ª and the free end of this spring rests upon a pin 80 which projects laterally from the face of the section 22ª. In other words the two springs 74 and 78 in connection with the sections 21ª and 22ª aid in maintaining the two sections in linked formation.

The main chain, the cross chains 24 and 26 and the auxiliary chain 60, with its associated parts, are all used in connection with the sections 21ª and 22ª and in the same manner as they are employed in connection with the sections 21ª and 22ª and in the same manner as they are employed in connection with the ring 20 shown in the Figs. 1, 2 and 6.

Referring to Fig. 9, it will be seen that a pulley and clutch arrangement is employed which is a modification of that shown in Fig. 6. In this construction the pulley 85 is supported by a shaft 86 carried by a U-shaped hanger 87 and this hanger partly houses the pulley. A chain or cable 60ª is trained on the pulley.

The hanger is provided with a strap or ring 88 which receives a ring 89 at one end of the chain 25ª.

A clutch element 90 is located within the hanger 87 and is provided with a notch 91 which is adapted to receive a spring 92. The other end of the spring is in engagement with an end wall 93 of the hanger. It will be noted that the clutch element 90 tapers from one end where the notch 91 is located to its other end 94. It will also be noted that the radius 95 of one end of the hanger 87 is shorter than the radius 96. Therefore, the housing progressively decreases in radius from one end to the other to conform to the progressive decrease in width of the clutch 90.

Thus a pin 97 which is secured to the clutch 90 projects through a slot 98 in the outer end of the hanger 87 so that the pin may be grasped by the hand and moved against the tension of the spring 92 to release the clutch element from its gripping engagement with the chain or cable 60ª. In other words, when the pulley tends to move in the direction indicated by the arrow in Fig. 9, the more 90 will clamp the cable against the pulley and prevent further rotation of said pulley.

I claim:

1. An automobile skid chain comprising a split ring formed of two sections and adapted to be applied to one side wall of the tire casing, means pivotally connecting the two sections with one of the sections swingable laterally from one end of the other section, a main chain adapted to be applied to the other side wall of the casing, cross chains connected between the chain and ring, said swingable section and connected portion of the main chain adapted to be moved laterally away from the other section when the last mentioned section is applied to the casing and then swung back again over the casing to complete the tire chain over said casing, and means removably connecting the ends of the main chain together.

2. An automobile skid chain comprising a split ring formed of two sections and adapted to be applied to one side wall of the tire casing, means pivotally connecting the two sections with one of the sections swingable laterally from one end of the other section, a main chain adapted to be applied to the other side wall of the casing, cross chains connected between the chain and ring, said swingable section and connected portion of the main chain adapted to be moved laterally away from the other section when the last mentioned section is applied to the casing and then swung back again over the casing to complete the tire chain over said casing, a sprocket having grooves at one face, a hanger for the sprocket for rotatably supporting the sprocket, and having the free end connected to one end of the main chain, an auxiliary chain having one end connected to the other end of the main chain and trained over the sprocket, a spring connecting the other end of the auxiliary chain to a link of the main chain inwardly of the end thereof, and a pawl carried by the hanger and engageable with a groove to retain the sprocket against rotation.

3. An automobile skid chain comprising a main side chain, a ring, cross chains connected between the ring and main chain and means for connecting the ends of the main chain together including a sprocket having grooves at one face, a hanger for the sprocket for rotatably supporting the sprocket, and having the free end connected to one end of the main chain, an auxiliary chain having one end connected to the other end of the main chain and trained over the sprocket, a spring connecting the other end of the auxiliary chain to a link of the main chain inwardly of the end thereof, and a pawl, carried by the hanger and engageable with a groove to retain the sprocket against rotation.

4. An automobile skid chain comprising a side chain, a split ring formed of two sections and cross chains connected between the ring and side chain, the adjacent ends of the sections being enlarged and provided with hollow articulated portions, to form a hinge joint, a pin received by the articulated portions, said pin having radially alined slots through which the key may be withdrawn to release the pin from all but a pair of the portions, means on an end of articulated portions to prevent removal of the pin entirely from the joint, one of the sections having a notch to receive the key for retaining the pin against release.

5. An automobile skid chain comprising a split ring formed of two sections and adapted to be applied to one sidewall of a tire casing, the adjacent ends of the sections having articulated portions, a pin received by the portions to form a hinge joint, cooperating means on the pin and joint to release partially the pin from the joint, a side chain at the other face of the casing, cross chains over the tread of the casing connecting the side chain with the ring, means joining the ends of the side chain together, one of the sections together with the associated portion of the side chain and connected cross chains being swung outwardly from the plane of the other section when the skid chain is applied to the casing.

6. An automobile skid chain comprising a side chain, a spit ring composed of at least two sections and cross chains connected between the sections and side chain, the adjacent ends of the sections being enlarged and provided with articulated portions having alined circular passages and alined slots rectangular in cross sections and opening into the circular passage, a hinge pin fitted into the alined circular passages and provided with a key at one end adapted to be withdrawn through the rectangular passages for releasing the pin from a majority of the articulated portions when the tire chain is being removed from the casing, one of the sections having a notch at the inner periphery to receive the key and retain the pin in operative position and means removably connecting the ends of the side chain together.

7. An automobile skid chain comprising a side chain, a split ring composed of at least two sections and cross chains connected between the sections and side chain, the adjacent ends of the sections being enlarged and provided with articulated portions having alined circular passages and alined slots rectangular in cross section and opening into the circular passages, a hinge pin fitted into the alined circular passage and provided with a key at one end adapted to be withdrawn through the rectangular passages for releasing the pin from a majority of the articulated portions when the tire chain is being removed from the casing, one of the sections having a notch at the inner periphery to receive the key and retain the pin in operative position, said pin having a head adjacent the outer periphery of said section, a spring between the head and said section for retaining the key in the notch and means connecting the ends of the side chain together.

8. An automobile skid chain comprising a side chain, a split ring composed of at least two sections and cross chains connected between the sections and side chain, the adjacent ends of the sections being enlarged and provided with articulated portions having alined circular passages and alined slots rectangular in cross section and opening into the circular passages, a hinge pin fitted into the alined circular passage and provided with a key at one end adapted to be withdrawn through the rectangular passages for releasing the pin from a majority of the articulated portions when the tire chain is being removed from the casing, one of the sections having a notch at the inner periphery to receive the key and retain the pin in operative position, a pulley carried by one end of the side chain, an auxiliary chain connected to the other end of the side chain and trained over the pulley, and a coil spring attached at one end to the auxiliary chain, said spring at the other end having means to connect with the side chain for maintaining the side chain in position.

IRENEUS BASIL HOLTZ.